March 1, 1949.　　A. L. PARKER　　2,463,196
COUPLING FOR TUBES
Filed May 15, 1945
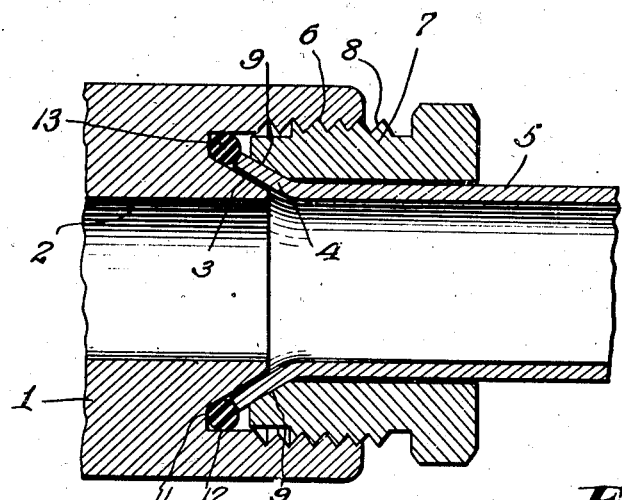
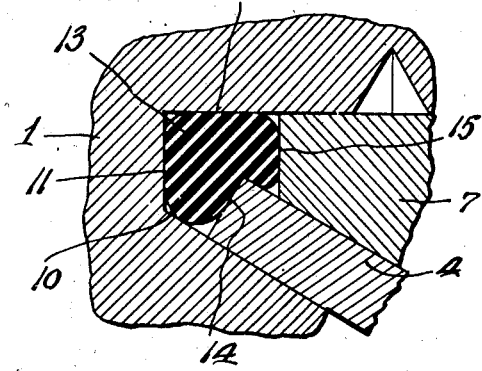
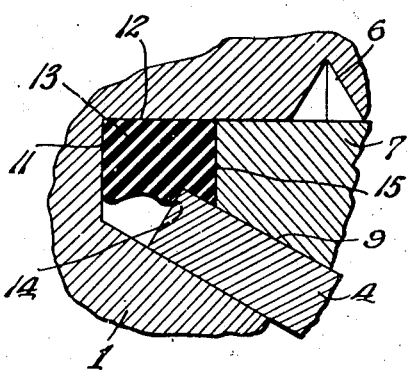
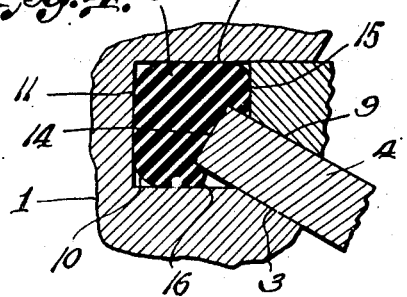
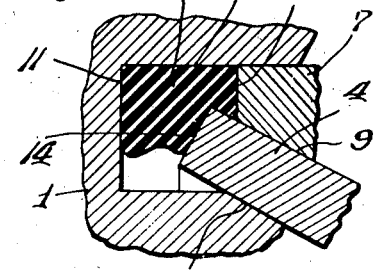
INVENTOR.
Arthur L. Parker, deceased
BY Helen M. Parker, executrix
By Mason, Porter & Diller
ATTORNEYS.

Patented Mar. 1, 1949

2,463,196

UNITED STATES PATENT OFFICE 2,463,196

COUPLING FOR TUBES

Arthur L. Parker, deceased, late of Cleveland, Ohio, by Helen M. Parker, executrix, Shaker Heights, Ohio, assignor to The Parker Appliance Company, Cleveland, Ohio, a corporation of Ohio Application May 15, 1945, Serial No. 593,798

1 Claim. (Cl. 285—86)

The invention relates to new and useful improvements in couplings for tubes and more particularly to a two-piece coupling adapted to engage the flared end of the tube for securing the same to the coupling.

An object of the invention is to provide a coupling of the above type with a chamber at the inner end of the seat on the body member for a ring gasket, which chamber is so disposed that the flared end of the tube will extend into the chamber and contact with the gasket and distort the same into tight sealing contact with the walls of the chamber.

A further object of the invention is to provide a coupling of the above type wherein the volume of the gasket is slightly smaller than the volume of the chamber so that in the closing of the coupling the gasket will be distorted into tight sealing contact with the walls of the chamber therefor without overstressing the gasket.

In the drawings—

Figure 1 is a longitudinal sectional view through a coupling embodying the improvements with the nut in finger-tight engagement with the tube.

Figure 2 is an enlarged view of a portion of the coupling showing the tube end clamped against the seat on the body portion and the ring gasket distorted into sealing contact with the walls of the chamber in which the gasket is disposed.

Figure 3 is a view similar to Figure 2 but showing the further distortion of the ring gasket by the fluid pressure from the line.

Figure 4 is a view similar to Figure 2 but showing a slightly modified arrangement of the chamber for the ring gasket.

Figure 5 is a view similar to Figure 4 but showing the effective distortion of the ring gasket by fluid pressure from the line.

The coupling embodying the improvements consists of a body portion 1 having a bore 2 therethrough conforming substantially in diameter to the inner diameter of a tube to be clamped in the coupling. The body portion 1 is shaped so as to provide a conical seat 3 which is adapted to engage the inner surface 4 of the flared end of the tube 5. As shown the body member is provided with a bore having a thread 6 on its inner face.

The tube is secured to the body member by a nut 7 which is provided with a thread 8 adapted to cooperate with the thread 6 on the body member. The nut has a conical surface 9 which engages the outer surface of the flared end of the tube 5 and, when the nut is threaded into the body member, it will clamp the flared end of the tube tightly against the seat 3.

The body member at the inner end of the seat 3 is shaped so as to provide a recess for a ring gasket. This recess is bounded by a wall 10 which is an extension of the seat 3, a wall 11, and a wall 12. Disposed in this recess is a ring gasket 13 which may be of any suitable cross section but, as shown in the drawings, is circular in cross section. This ring gasket may be made of any suitable deformable material but is preferably made of rubber.

After the gasket has been placed in the recess the recess is closed in part by the end portion 14 of the flared end of the tube and the end 15 of the nut 7. This makes a closed chamber in which the ring gasket is disposed.

The gasket is dimensioned so that the volume of the chamber is larger than the volume of the ring gasket. When the nut is tightened and the flared end of the tube is clamped against the seat 3 the end portion of the tube will contact with the gasket and will deform the gasket, making tight sealing contact therewith and causing said sealing gasket to seal against the walls 11 and 12 and also against the end of the nut 15. The tendency of the ring gasket to return to its original cross sectional shape, together with the pressure of the tube end and nut against the gasket, will ensure a very tight seal so that fluid from the line cannot pass the gasket and escape through the joint between the nut and the body member or through the joint between the nut and the tube. It is only necessary that there shall be a tight seal between the wall 12 and the gasket and the end of the tube 14 and the gasket. However, this distorting of the gasket will produce a seal between the gasket and the wall 11 and between the gasket and the end of the nut, and possibly between the gasket and the wall 10 which is an extension of the seat 3.

Inasmuch as the volume of the gasket is smaller than the volume of the gasket chamber, when the coupling is closed the gasket will not be overstressed but rather lightly distorted just enough to establish the fluid tight seals referred to above. This limited distortion of the ring gasket prevents damage to the gasket and permits positive metal-to-metal clamping of the tube flare against the seat 3 wihout danger of pinching the ring gasket between the flare and said metal seat 3, or between the flared end of the tube and the nut.

The volume of the gasket as compared with the volume of the gasket chamber is sufficiently great so that when high pressure fluid on the line which might leak past the seat 3 acts on the ring gasket it will force the gasket into the corner of the chamber, as shown in Figure 3, and this increases the tightness of the seal.

It is noted that the flared end of the tube extends beyond the end wall 15 of the nut and this end wall 15 and the outer face of the projecting portion of the flare provide a wedge-shaped space into which the ring gasket is forced by the fluid pressure. The greater the pressure the greater will be the wedging grip of these walls on the gasket. The same is true in a measure between the wall 15 and the wall 12. The fluid pressure on the gasket will wedge the gasket into this corner and thus increase the tightness of the seal between the nut and the body member.

It is noted that the gasket chamber is defined by smooth walls which will not cut the gasket during the assembling of the parts nor by the distorting of the same under fluid pressure.

There is a slight slip fit clearance between the outer surface of the extension of the nut and the inner wall 12 of the body member when the parts are assembled but, when the nut is tightened against the flared end of the tube, the nut end will be expanded to close up this clearance as clearly shown in Figures 2 and 3. Thus the chamber for the gasket is very effectively closed and there are no clearance spaces into which fluid pressure can destructively force the ring gasket.

As shown in Figures 4 and 5, the recess forming the chamber for the ring gasket is cut further into the body member so that the inner wall 16 of the gasket chamber is parallel with the outer wall 12. The flared end of the tube extends into the chamber beyond the wall 16 as well as beyond the end 15 of the nut. This will distort the gasket 13 so as to make even tighter contact with the wall 16 as well as with the walls 11 and 12. Otherwise the structure shown in Figure 4 is similar to that shown in Figures 1 to 3 and like numerals have been applied thereto.

In Figure 5 the fluid pressure from the line is shown as having leaked by the seat 3 and contacted with the gasket so as to force it into the corners between the walls 12 and 11 and also wedge it into the corner between the body member and the end of the nut and into the corner between the nut and the outer face of the flared end of the tube.

When the body member is constructed as shown in Figures 4 and 5 the ring gasket will be retained in the recess by friction so that the body of the coupling and the ring gasket are more or less of a unitary structure and only two parts (nut and body) need be stocked and handled.

It is obvious that minor changes in the details of construction and the shaping of the parts may be made without departing from the scope of the invention as set forth in the appended claim.

What is claimed is:

A coupling for tubes comprising a body member counterbored to provide a projecting tapered seat for the flared end of the tube, said counterbore at the outer portion thereof being threaded and at the inner portion being smooth, a nut having a tapered inner face adapted to engage the flared end of a tube for clamping the same against said seat, said nut having a threaded portion adapted to engage the threaded portion on the body member and a projecting nose having at its inner end portion a smooth surface adapted to contact the smooth portion of the bore and form with said tube end a closed gasket chamber in said body member, a gasket in said chamber, said nut being dimensioned so that the flared end of the tube projects beyond the end of the nut, and said gasket being dimensioned so that when the tube is clamped against the seat, the tube end will engage the gasket and distort the same into tight sealing contact with the tube, the counterbore and the end wall of the nut.

HELEN M. PARKER,
*Executrix of the Estate of Arthur L. Parker, Deceased.*

REFERENCES CITED

The following references are of record in the file of this patent:

UNITED STATES PATENTS

| Number | Name | Date |
| --- | --- | --- |
| 3,062 | McLeod | Aug. 4, 1868 |
| 1,943,717 | Barnes | Jan. 16, 1934 |
| 2,092,135 | Parker | Sept. 7, 1937 |
| 2,110,825 | Archer | Mar. 8, 1938 |